Patented Jan. 29, 1929.

1,700,692

UNITED STATES PATENT OFFICE.

WILLIAM TOWNSEND, OF CHICAGO, ILLINOIS, ASSIGNOR TO THE CONNERSVILLE BLOWER CO., OF CONNERSVILLE, INDIANA, A CORPORATION OF INDIANA.

WIDE-RANGE METER.

Application filed October 25, 1926. Serial No. 143,899.

In that type of meter which is characterized by two mating lobed rotating elements within a casing, the lobed elements do not actually contact with each other and there is therefore a certain unavoidable leakage or "slippage" which, during periods of low demand insufficient to cause any rotation of the meter elements, may pass through the meter without being measured or accounted for.

The object of my present invention is to provide in connection with a meter of the described type means which will insure movement of the metering elements even though the consumption demand be so low as to be incapable of causing movement of the metering elements, the construction being such, however, that the amount of gas actually passing from the system may be accurately determined.

Figure 1:
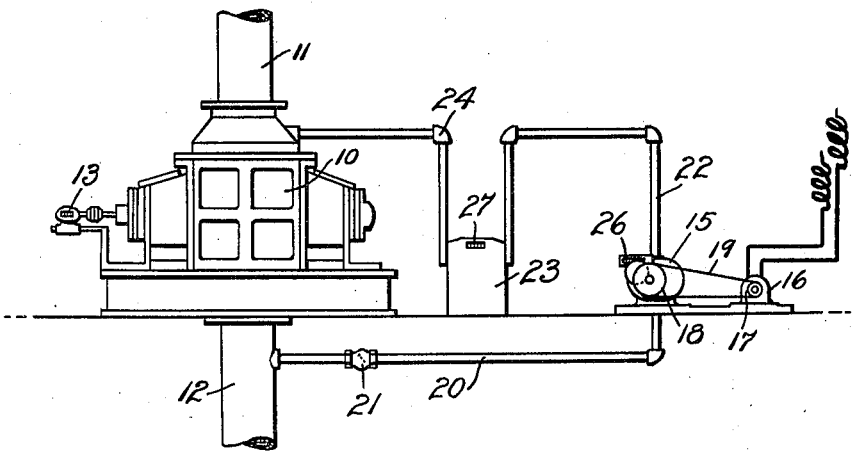

The accompanying drawings illustrate my invention:

Fig. 1, is a diagrammatic elevation of a metering system involving my improvement, the construction being such that the booster will be in continuous operation.

Figure 2:
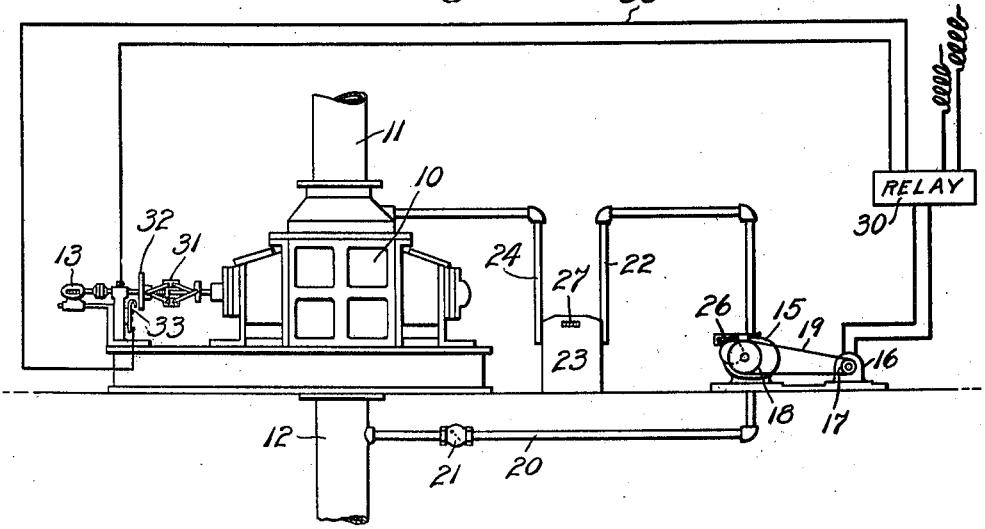

Fig. 2, a diagram of an arrangement wherein the booster will be automatically stopped and started according to the consumption demand.

Figure 3:
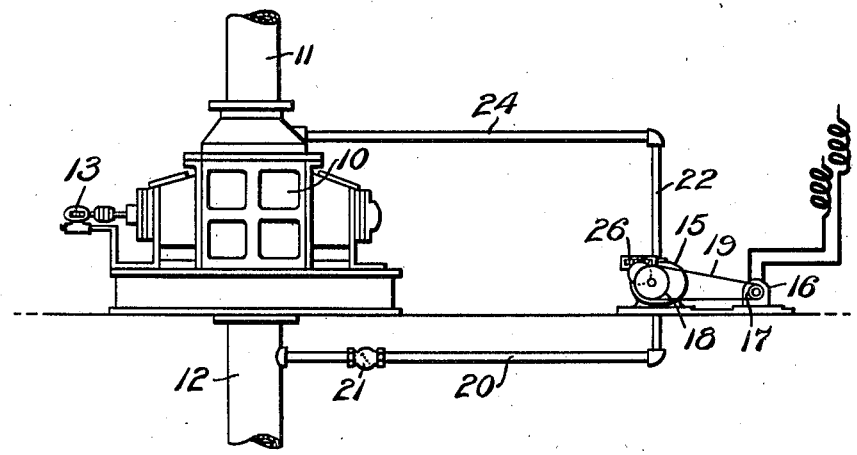
Figure 4:
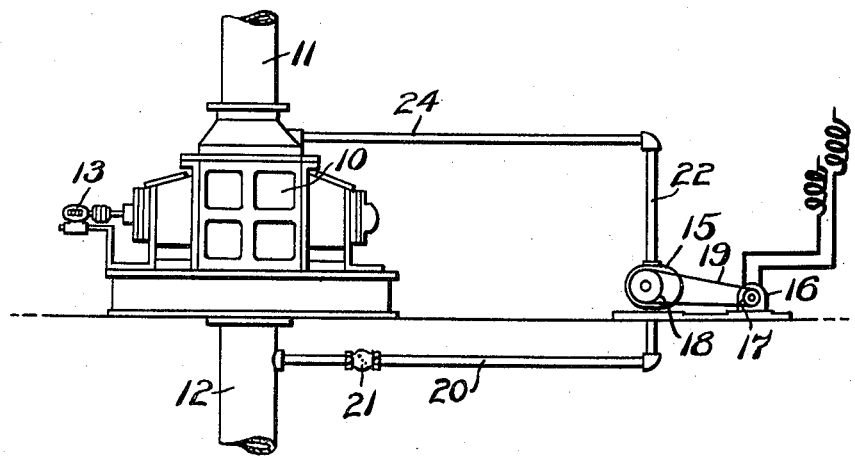

Fig. 3 is a diagrammatic elevation of a modification of my invention, and Fig. 4 is a diagrammatic elevation of still another modification of my invention.

In the drawings 10 indicates a lobed element meter, such for instance as those now commonly on the market as the product of the Connersville Blower Company, of Connersville, Indiana, such meter being a large capacity meter comprising a casing, two rotary lobed metering elements rotatively and coactively mounted within the casing and movable under the differential of normal consumption of the gas to be metered, said meter also comprising an inlet pipe 11, and outlet or delivery pipe 12 and a registering or recording meter 13 connected to one of the moving meter elements.

A proper construction of this meter is shown in the Wilkins Patent No. 1,528,728.

In order to cause the movable elements of meter 10 to move even though the outflow from pipe 12 be less than sufficient to produce a differential capable of causing rotation of such movable elements, I provide a booster 15 which may conveniently be an ordinary lobed impeller exhauster, the elements of which are positively driven by means of a motor 16, pulleys 17 and 18 and belt 19. The inlet side of said booster is connected with the outlet pipe 12 of meter 10 by means of a pipe 20 in which is mounted a check valve 21 opening toward the booster. Leading from the outlet side of the booster is a pipe 22 which delivers to a small capacity meter 23 of a non-slippage type, i. e., a wet meter, a diaphragm meter, etc. The delivery side of the non-slippage meter 23 is connected by pipe 24 with the inlet side of meter 10. Booster 15 may be provided in a well known manner with a properly calibrated register or recorder 26 which will give an accurate indication or record of the quantity of gas passing therethrough. Meter 23 will also be equipped with a properly calibrated register or recorder 27 which will give an indication of the amount of gas passing through the meter 23.

In Fig. 2 the booster motor 16 is controlled by a relay 30 which is started and stopped by a speed controlled governor 31 mounted on the operating shaft for the register 13. Said speed controlled governor comprises a movable contact 32 contacting with terminal 33 when the speed drops below a predetermined point, said contact 32 and terminal 33 being in the control circuit 35 of the relay.

In operation, movement of the booster 15 repasses through the meter 10 a sufficient quantity of gas to keep its metering elements in movement and this quantity is definitely measured by the indicators or recorders 26 and 27, either or both, and, in determining total consumption, the total indicated by register 13 is diminished by the total which is passed through the booster.

Of course, when there is no consumption demand on outlet 12 the booster reading will be equal to the main meter reading during the period of non-consumption.

It will, of course, be understood that the non-slippage meter 23 is not an absolute essential because the booster may be driven at a uniform speed and, when so driven may be accurately calibrated against the main meter reading. It will also be understood that where the non-slippage meter 23 is used the indicator 26 is not necessary. It will also be understood that even where the non-slippage meter 23 is omitted the booster indicating mechanism 26 may also be omitted if the booster be run at a constant speed because, with pumps of the type indicated, they may be very accurately calibrated so that the total flow of gas induced thereby during any given period is accurately known and, therefore, the reading of meter 13 may be diminished by the known constant delivery of the booster thus giving the proper consumption data.

In certain of the claims the expression "metered booster" is used and it will be understood that this term is intended to include not only a structure wherein the booster is provided with a meter such as is shown in Figs. 1 and 2 but contemplates the use of an indicator such as 26 or the use of a booster accurately calibrated and run at constant speed as indicted in Fig. 4.

I claim as my invention:

1. The combination of, a gas meter of the mating lobed element type, a booster pump having its inlet connected to the discharge side of the meter and its outlet connected with the inlet side of said first mentioned meter, a check valve arranged in the inlet line of the booster and opening toward the booster, and a non-slippage meter in one connection between the booster and first meter.

2. The combination of, a gas meter of the mating lobed element type, a metered booster pump having its inlet connected to the discharge side of the meter and its outlet connected with the inlet side of said meter.

3. The combination of, a gas meter of the mating lobed element type, a booster pump having its inlet connected to the discharge side of the meter and its outlet connected with the inlet side of said meter, and a non-slippage meter in one connection between the booster and the first meter.

4. The combination of, a gas meter of the mating lobed element type, a metered booster pump having its inlet connected to the discharge side of the meter and its outlet connected with the inlet side of said meter, and a check valve arranged in the inlet line of the booster and opening toward the booster.

In witness whereof I, WILLIAM TOWNSEND, have hereunto set my hand at Chicago, Ill., this 20th day of October, A. D. one thousand nine hundred and twenty six.

WILLIAM TOWNSEND.